(12) United States Patent
Moran

(10) Patent No.: US 10,724,257 B2
(45) Date of Patent: *Jul. 28, 2020

(54) VERTICALLY RAISING SAFETY RAIL WITH DUAL CURTAIN ASSEMBLY

(71) Applicant: Control Dynamics, Inc., Everett, WA (US)

(72) Inventor: Eric Moran, Camano Island, WA (US)

(73) Assignee: Control Dynamics, Inc., Everett, WA (US)

(*) Notice: Subject to any disclaimer, the term of this patent is extended or adjusted under 35 U.S.C. 154(b) by 168 days.

This patent is subject to a terminal disclaimer.

(21) Appl. No.: 15/669,599

(22) Filed: Aug. 4, 2017

(65) Prior Publication Data
US 2017/0335583 A1    Nov. 23, 2017

Related U.S. Application Data

(63) Continuation-in-part of application No. 14/689,970, filed on Apr. 17, 2015, now Pat. No. 9,745,762.
(Continued)

(51) Int. Cl.
*E01F 13/00* (2006.01)
*E04G 21/32* (2006.01)
(Continued)

(52) U.S. Cl.
CPC ...... *E04G 21/3228* (2013.01); *E04F 11/1865* (2013.01); *E04G 5/142* (2013.01);
(Continued)

(58) Field of Classification Search
CPC ..... E04G 5/142; E04G 21/3228; E04G 21/32; E04G 5/14; E04G 2005/148; E01F 13/00;
(Continued)

(56) References Cited

U.S. PATENT DOCUMENTS

| 984,063 A | 2/1911 | Berg |
| 1,461,901 A | 7/1923 | Harmata |

(Continued)

FOREIGN PATENT DOCUMENTS

| AU | 2006100471 A4 | 7/2006 |
| DE | 3317659 A1 | 11/1984 |

(Continued)

OTHER PUBLICATIONS

International Searching Authority of WIPO; Int'l Search Report dated Mar. 5, 2019; PCT/US18/66402; pp. 1-13.
(Continued)

*Primary Examiner* — Daniel P Cahn
(74) *Attorney, Agent, or Firm* — FisherBroyles LLP; Kevin D. Jablonski

(57) ABSTRACT

A vertical raising safety rail. The safety rail includes lower linkage arm assemblies that are connected to a base and to a center rail assembly and configured to raise or lower the center rail assembly relative to the base when a rotational force is applied to the drive shaft. The safety rail also includes upper linkage arm assemblies that are connected to the center rail assembly and to a top rail. The upper linkage arm assemblies are connected to corresponding lower linkage assemblies and are configured to move the top rail relative to the center rail assembly. When the top rail is raised, one or more safety curtains are unfurled from a take-up roller inside the top rail to provide a safety curtain in the vertical plane of the safety rail.

14 Claims, 15 Drawing Sheets

Related U.S. Application Data

(60) Provisional application No. 62/085,147, filed on Nov. 26, 2014.

(51) Int. Cl.
*E04G 5/14* (2006.01)
*E04F 11/18* (2006.01)
*F16H 1/30* (2006.01)

(52) U.S. Cl.
CPC ........ *F16H 1/30* (2013.01); *E04F 2011/1876* (2013.01); *E04G 21/3266* (2013.01)

(58) Field of Classification Search
CPC ..... E01F 11/1865; E01F 13/048; E01F 13/04; E01F 13/046; E04H 5/06; E04F 11/1865; E04F 13/04; E04F 13/046; E04F 13/048; E04F 10/0603; B60R 3/005; E06B 9/0692; E06B 9/0661; E06B 9/18
USPC ........................................................ 182/113
See application file for complete search history.

(56) References Cited

U.S. PATENT DOCUMENTS

| | | | | |
|---|---|---|---|---|
| 1,749,197 | A * | 3/1930 | Stuart | E04F 10/0618 |
| | | | | 160/68 |
| 1,954,656 | A * | 4/1934 | Vallen | G03B 21/00 |
| | | | | 359/450 |
| 2,753,224 | A | 7/1956 | Troche et al. | |
| 3,160,228 | A | 12/1964 | De Witt Steed | |
| 3,309,086 | A | 3/1967 | Viets | |
| 3,950,050 | A | 4/1976 | Kinder | |
| 4,371,056 | A | 2/1983 | Anglade | |
| 2,245,417 | A | 6/1984 | Schlarmann | |
| 4,759,437 | A | 7/1988 | Bevins | |
| 4,782,914 | A | 11/1988 | Nail | |
| 4,915,496 | A | 4/1990 | Stine | |
| 4,936,407 | A | 6/1990 | Brock et al. | |
| 5,121,977 | A | 6/1992 | Weisgerber | |
| 5,284,198 | A * | 2/1994 | Kauka | E04F 10/0611 |
| | | | | 160/370.21 |
| 5,468,040 | A | 11/1995 | Peng et al. | |
| 5,615,729 | A * | 4/1997 | Matsumoto | B60J 1/2019 |
| | | | | 160/370.22 |
| 5,634,529 | A | 6/1997 | Nguyen et al. | |
| 5,653,278 | A * | 8/1997 | Cheng | B60J 1/2019 |
| | | | | 160/24 |
| 6,045,157 | A | 4/2000 | Poulin | |
| 6,191,886 | B1 | 2/2001 | Sinkoff | |
| 6,216,762 | B1 | 4/2001 | Lin | |
| 6,457,508 | B1 * | 10/2002 | Tomita | E04F 10/0618 |
| | | | | 135/88.12 |
| 6,782,904 | B2 | 8/2004 | Tien | |
| 7,017,976 | B1 * | 3/2006 | Rutherford | B60P 3/343 |
| | | | | 160/70 |
| 7,082,881 | B2 | 8/2006 | Schneider et al. | |
| 7,174,993 | B2 | 2/2007 | Lantz | |
| 7,228,884 | B2 | 6/2007 | Chen | |
| 7,619,814 | B2 | 11/2009 | Liang et al. | |
| 7,864,418 | B2 | 1/2011 | Kuroi et al. | |
| 8,031,400 | B2 * | 10/2011 | Wang | G03B 21/58 |
| | | | | 359/461 |
| 82,677,380 | | 9/2012 | Dormeville | |
| 8,308,217 | B2 | 11/2012 | Patel et al. | |
| 8,347,935 | B2 * | 1/2013 | Svirsky | E04F 10/10 |
| | | | | 160/352 |
| 8,526,109 | B1 | 9/2013 | Chen | |
| 8,833,429 | B2 | 9/2014 | Katada | |
| 10,066,414 | B2 * | 9/2018 | Ma | E04H 15/08 |
| 10,246,899 | B2 | 4/2019 | Sartin | |
| 10,314,183 | B2 | 6/2019 | Heo et al. | |
| 2003/0047382 | A1 | 3/2003 | Panacci | |
| 2003/0075657 | A1 | 4/2003 | Joubert | |
| 2004/0221965 | A1 | 11/2004 | Wagner et al. | |
| 2005/0174638 | A1 | 8/2005 | Kotera | |
| 2006/0180403 | A1 | 8/2006 | Hanlon | |
| 2006/0207021 | A1 | 9/2006 | Brunson et al. | |
| 2006/0213722 | A1 | 9/2006 | Cunningham | |
| 2007/0193700 | A1 | 8/2007 | Omelas et al. | |
| 2008/0150338 | A1 | 6/2008 | Baum | |
| 2009/0025887 | A1 | 1/2009 | Ito | |
| 2012/0079978 | A1 | 4/2012 | Teel | |
| 2012/0125544 | A1 | 5/2012 | Cannaverde | |
| 2012/0205604 | A1 | 8/2012 | Gutierrez et al. | |
| 2013/0118696 | A1 | 5/2013 | Gavish | |
| 2013/0119651 | A1 | 5/2013 | Conny et al. | |
| 2014/0374680 | A1 | 12/2014 | Tsang | |
| 2016/0194889 | A1 | 7/2016 | White | |
| 2017/0015285 | A1 | 1/2017 | Nebek | |
| 2017/0196351 | A1 | 7/2017 | Failing | |

FOREIGN PATENT DOCUMENTS

| | | |
|---|---|---|
| EP | 1072736 A1 | 1/2001 |
| EP | 1256666 A2 | 11/2002 |
| FR | 2665473 A1 | 2/1992 |
| FR | 2699208 | 6/1994 |
| GB | 2022672 A | 12/1979 |
| GB | 2274664 | 8/1994 |
| GB | 2379241 A | 3/2003 |
| NL | 1031600 | 10/2007 |
| WO | 9413885 A1 | 6/1994 |
| WO | WO 2012/103579 A1 | 8/2012 |

OTHER PUBLICATIONS

ISR/WO International; Appl. No. PCT/AU2009/000866, filing date Jul. 3, 2009.

* cited by examiner

VERTICALLY RAISING SAFETY RAIL WITH DUAL CURTAIN ASSEMBLY

PRIORITY CLAIM TO RELATED APPLICATIONS

The present application claims priority and benefit from U.S. patent application Ser. No. 14/689,970 filed Apr. 17, 2015 and titled, "Vertically Raising Safety Rail" which, in turn, claims priority to U.S. Provisional Patent Application Ser. No. 62/085,147, filed Nov. 26, 2014, and entitled "Vertically Raising Safety Rail". The entire content of the parent application and the provisional application is herein expressly incorporated by reference.

TECHNICAL FIELD

The present subject matter relates to a vertically raising safety rail having a base, a moveable center rail assembly, and a moveable top rail with a pair of operably connected upper and lower linkage arms assemblies configured to move the center rail assembly relative to the base and the top rail relative to the center rail assembly. A motor provides a rotational force to a drive shaft that transmits a force to the lower linkage arm assemblies in order to move the center rail assembly and, in turn, the top rail.

BACKGROUND

Safety rails are known and required as an OSHA requirement on industrial sites and a good safety tool. However, some applications where lifts are required to get to the work space make a traditional non-moveable safety rail impractical or dangerous. A moveable safety rail system that vertically raises and lowers, depending on the application, is desirable and currently unknown.

SUMMARY

The present subject matter is directed to a vertically raising safety rail having a moveable top rail, a base, and a moveable center rail assembly that is positioned above the base and below the top rail. A pair of lower linkage arm assemblies is operably connected to the base and the center rail assembly and configured to move the center rail assembly relative to the base. A corresponding pair of upper linkage arm assemblies is operably connected to the center rail assembly and the top rail and configured to move the top rail relative to the center rail assembly. Each individual lower linkage arm assembly and corresponding upper linkage arm assembly are operably connected. The subject matter further includes a motorized drive shaft that transmits a rotational force to the lower linkage arms assemblies in order to move the lower linkage arm assemblies between the base and center rail assembly, thereby raising or lowering the center rail assembly. The upper linkage arm assemblies, being operably connected to the lower linkage arm assemblies, also move the top rail relative to the center rail. When the rotational force is reversed, the safety rail collapses into a compact footprint.

These and other advantages are discussed and/or illustrated in more detail in the DRAWINGS, the CLAIMS, and the DETAILED DESCRIPTION.

BRIEF DESCRIPTION OF THE DRAWINGS

The accompanying figures, which are incorporated in and constitute a part of this specification, illustrate various exemplary embodiments.

DETAILED DESCRIPTION

Figure 1:
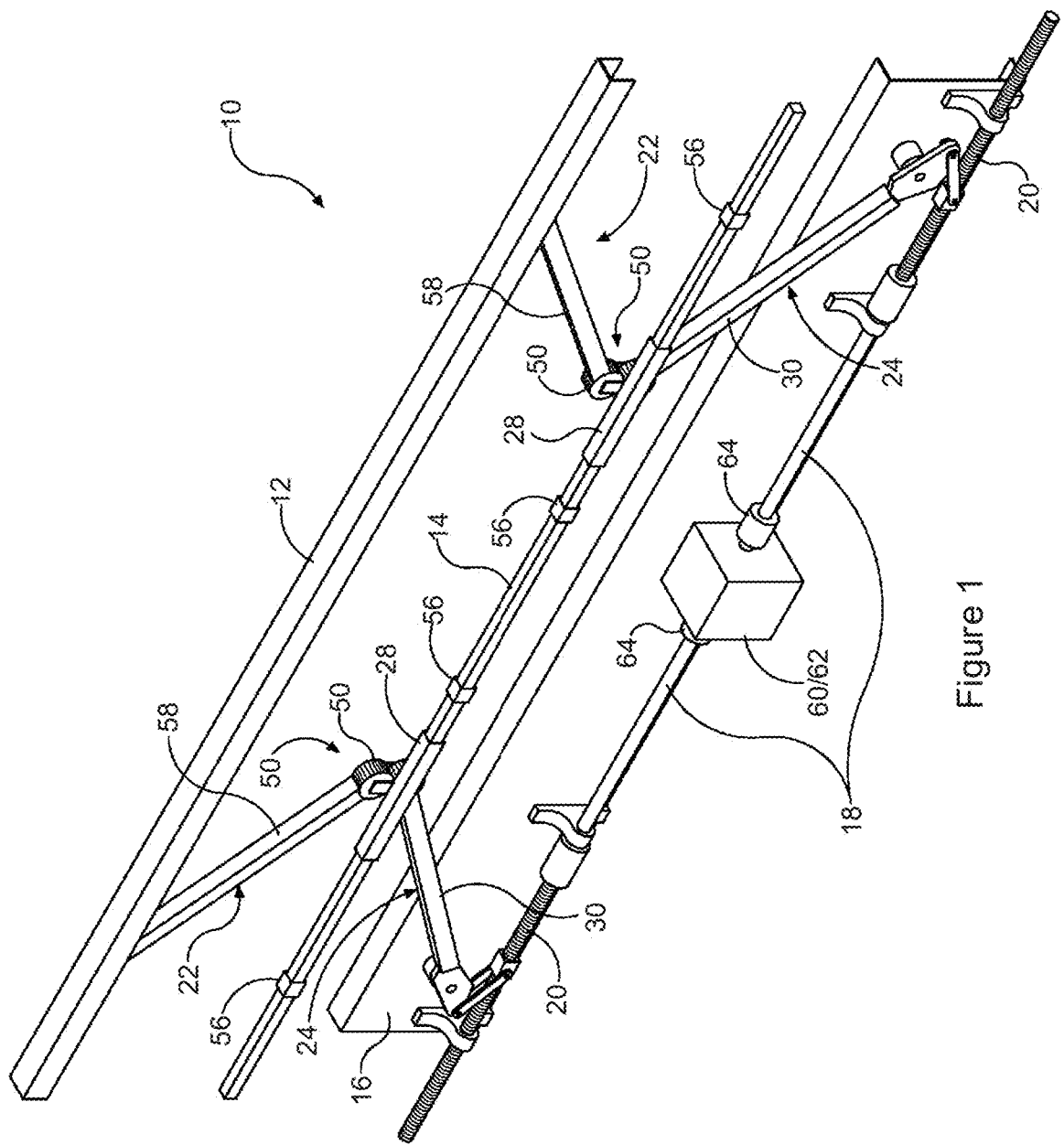
FIG. 1 is a rear isometric view of a vertically raising safety rail system of an embodiment in the raised position; the safety rail system illustrating a top rail; a center rail assembly having a center rail, one or more optional slidable rail guide tube that receives and supports the center rail, and one or more optional rail stops; a base support; at least one drive shaft; and a pair of upper and lower linkage arm assemblies.

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

Referring to FIGS. 1-7, a collapsible safety rail 10 has a moveable top rail 12, a moveable center rail 14, a base 16 supporting a drive shaft 18 positioned between two threaded shafts 20, a pair of spaced apart rotating upper linkage assemblies 22, and a pair of spaced apart rotating lower linkage arm assemblies 24. Each upper linkage assembly 22 is operably connected to its corresponding lower linkage arm assembly 24 at a midpoint and is further connected to a slidable rail guide tube 28 that receives the center rail 14.

Figure 8:
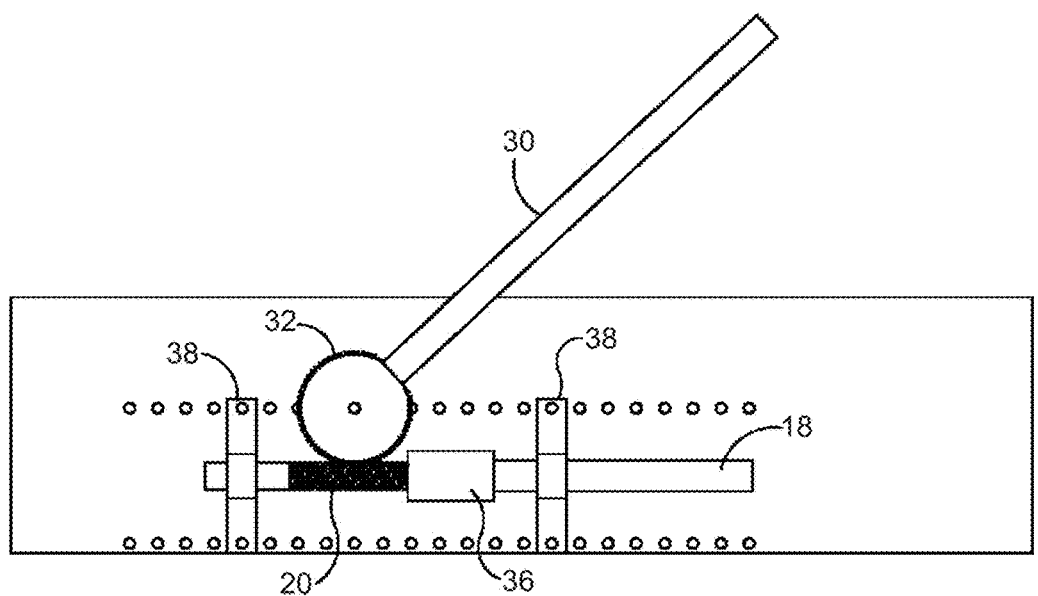
FIG. 8 is an enlarged rear view of a first embodiment lower linkage arm assembly in a raised position illustrating a worm gear in mating connection with a threaded shaft to obviate the need for a threaded nut and ball screw.
Figure 9:
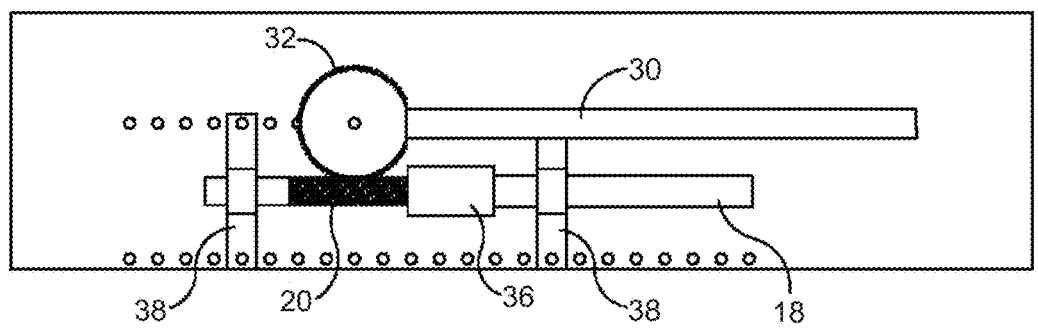
FIG. 9 is the same as FIG. 8 except illustrating the lower linkage arm assembly in the fully collapsed position.
Figure 10:
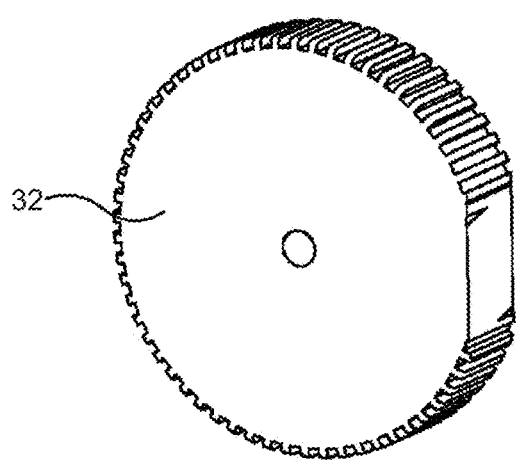
FIG. 10 is an enlarged rear perspective view of the worm gear.

Referring now to FIGS. 8, 9, and 10, a first embodiment lower linkage assembly includes a lower linkage arm 30 that is connected to a worm gear 32. The worm gear 32 travels along its corresponding threaded shaft 20 that is bordered by a drive shaft coupling 36 and a pillow support bracket 38. Rotational force is transferred to linear motion via the threaded shaft 20 and the worm gear 32 attached to the lower linkage arm 30.

Figure 11:
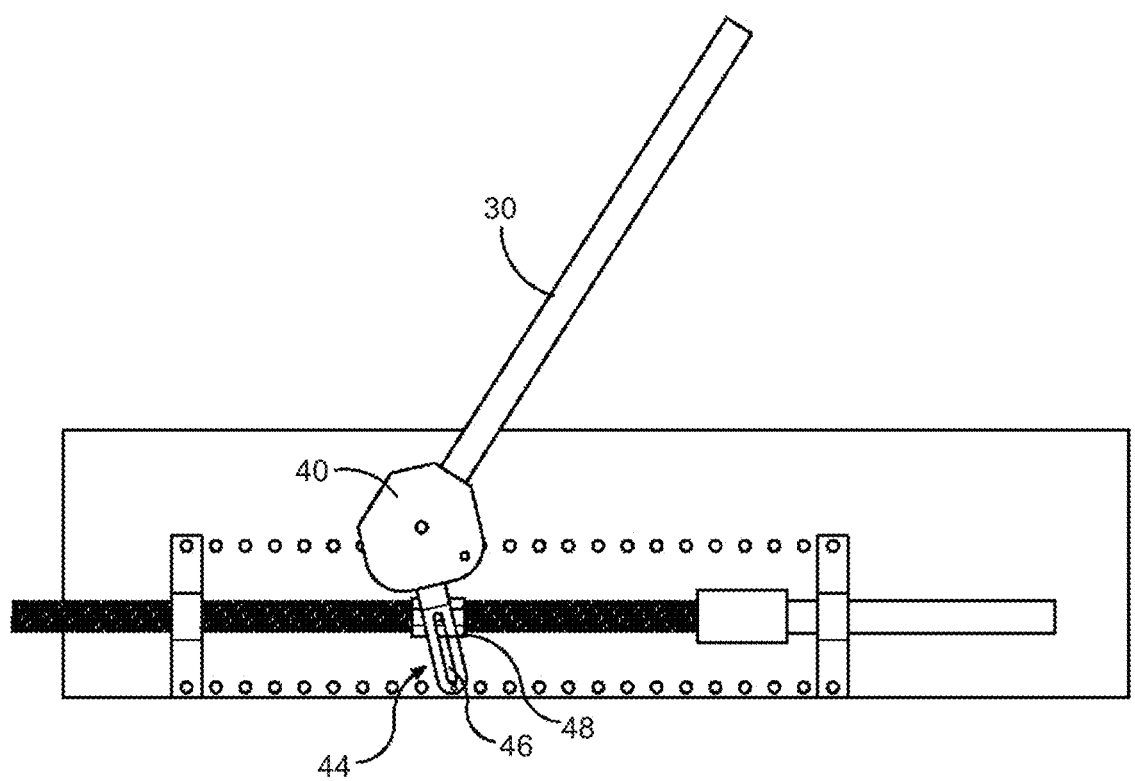
FIG. 11 is an enlarged rear view of a second embodiment lower linkage arm assembly in a raised position with an arm plate and fork bracket connected to a threaded nut/ball screw assembly.

Referring now to FIG. 11, a second embodiment lower linkage assembly includes an arm plate 40 that is connected to a fork bracket 44 that allows the shortened link arm to travel along the length of a slot 46 within the fork bracket 44. The fork bracket 44 is connected to a ball screw and threaded nut assembly 48 that is capable of travelling the length of the unbounded threaded shaft 20. Each ball screw and threaded nut assembly 48 can travel up to 16 inches along the threaded shaft 20 with a preferred travel span of 12 inches. Here, rotational force is transferred to linear motion via the threaded shaft 20 to the ball screw/threaded nut assembly to the fork bracket 44, arm plate and connected lower linkage arm 30.

Figure 12:
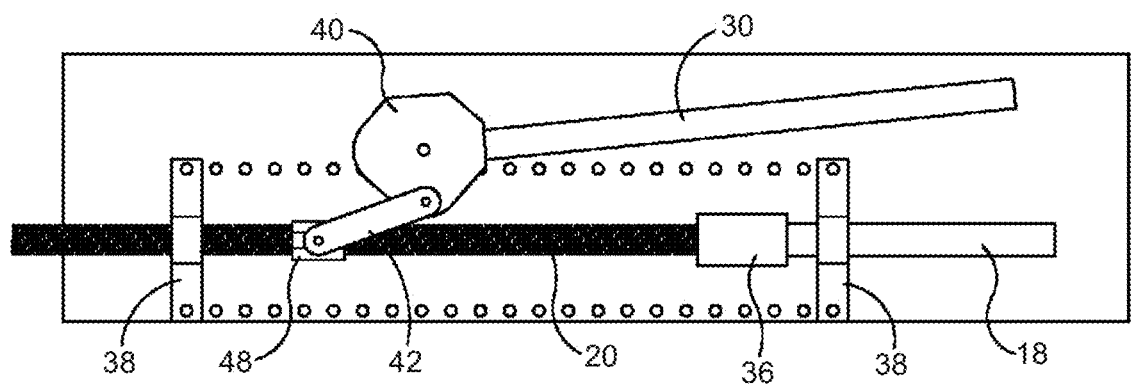
FIG. 12 is a rear perspective view of a third embodiment lower linkage arm assembly in a partially raised position illustrated with a drag linkage arm attached to the threaded nut/ball screw assembly.
Figure 13:
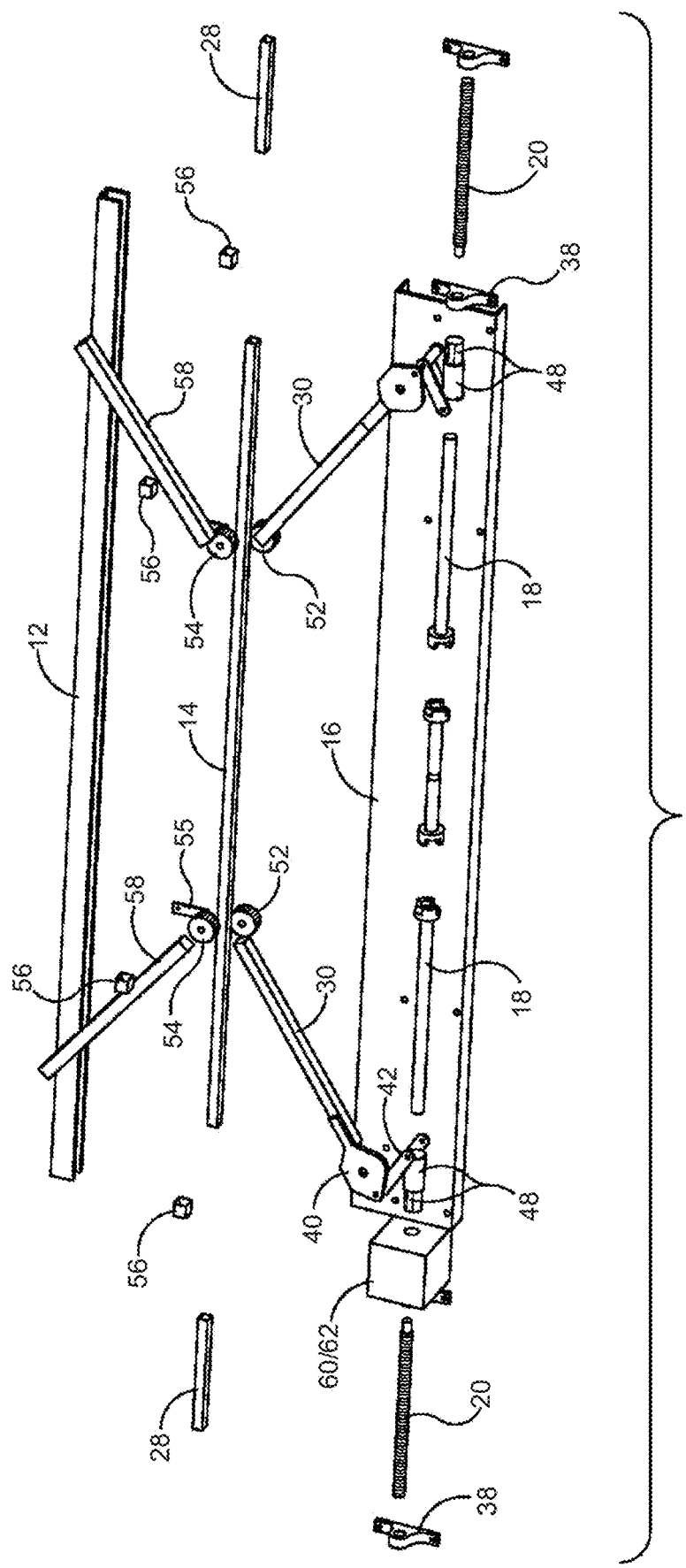
FIG. 13 is an exploded rear perspective view of the safety rail better illustrating the mesh gear assembly.

Referring now to FIG. 12, a third embodiment lower linkage assembly includes the arm plate 40 and lower linkage arm 30 as discussed above, but also includes a short drag linkage arm 42 that is connected to the ball screw/threaded nut assembly 48, also as discussed above. Here, rotational force is transferred to linear motion via the threaded shaft 20 to the ball screw/threaded nut assembly to the short drag linkage arm to the arm plate 40 and connected lower linkage arm 30.

Figure 19:
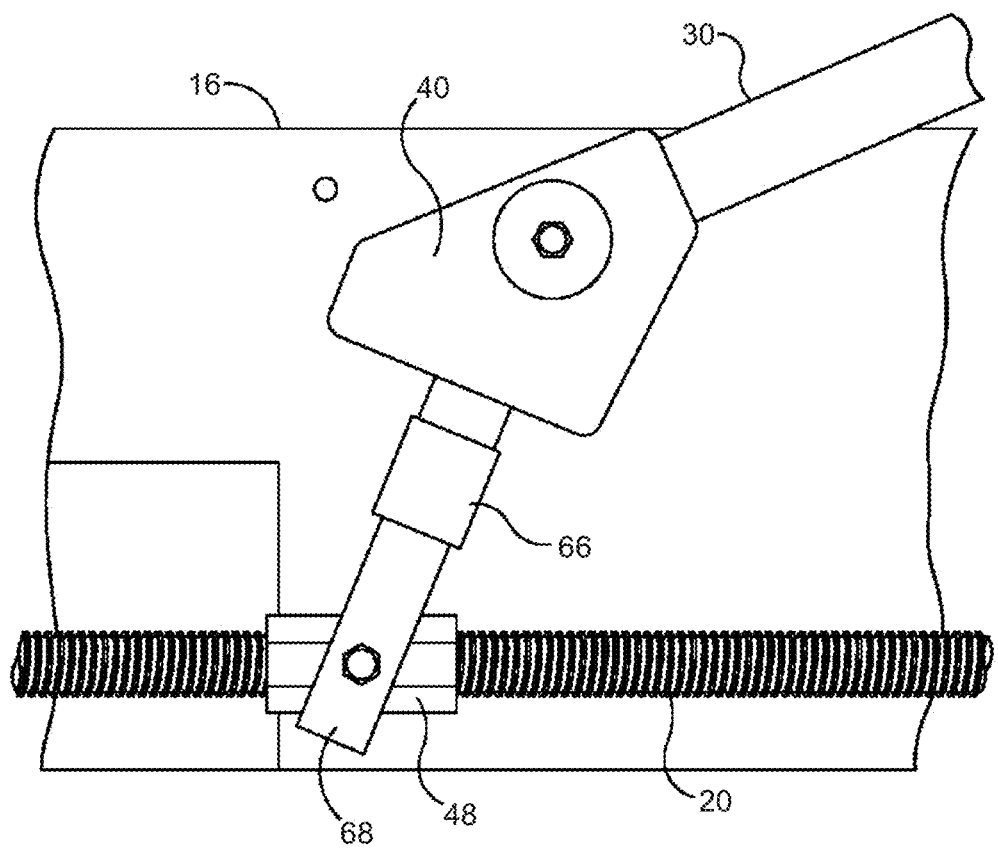
FIG. 19 is rear view of a fourth embodiment lower linkage arm assembly in a raised position with an arm plate and telescoping member and solid fork bracket connected to the threaded nut/ball screw assembly.

Referring now to FIG. 19, a fourth embodiment lower linkage arm assembly includes an arm plate 40 connected to a lower linkage arm 30 as discussed above. But instead of a short drag linkage arm 42 or slotted fork bracket 44 of FIGS. 11 and 12, respectively, the arm plate 40 is connected to a short telescoping member 66 attached to a solid fork bracket 68 that is attached to the ball screw/threaded nut assembly 48.

Referring now to FIGS. 20-24, a fifth embodiment lower linkage arm assembly includes an arm plate 40 connected to a lower linkage arm 30 as discussed above and also includes a short drag linkage arm 42 that is attached the ball screw/threaded nut assembly 48. Here, though, the rotation function is effectuated though a double tapered bearing 41 that is integrated into lower linkage arm assembly.

Figure 14:
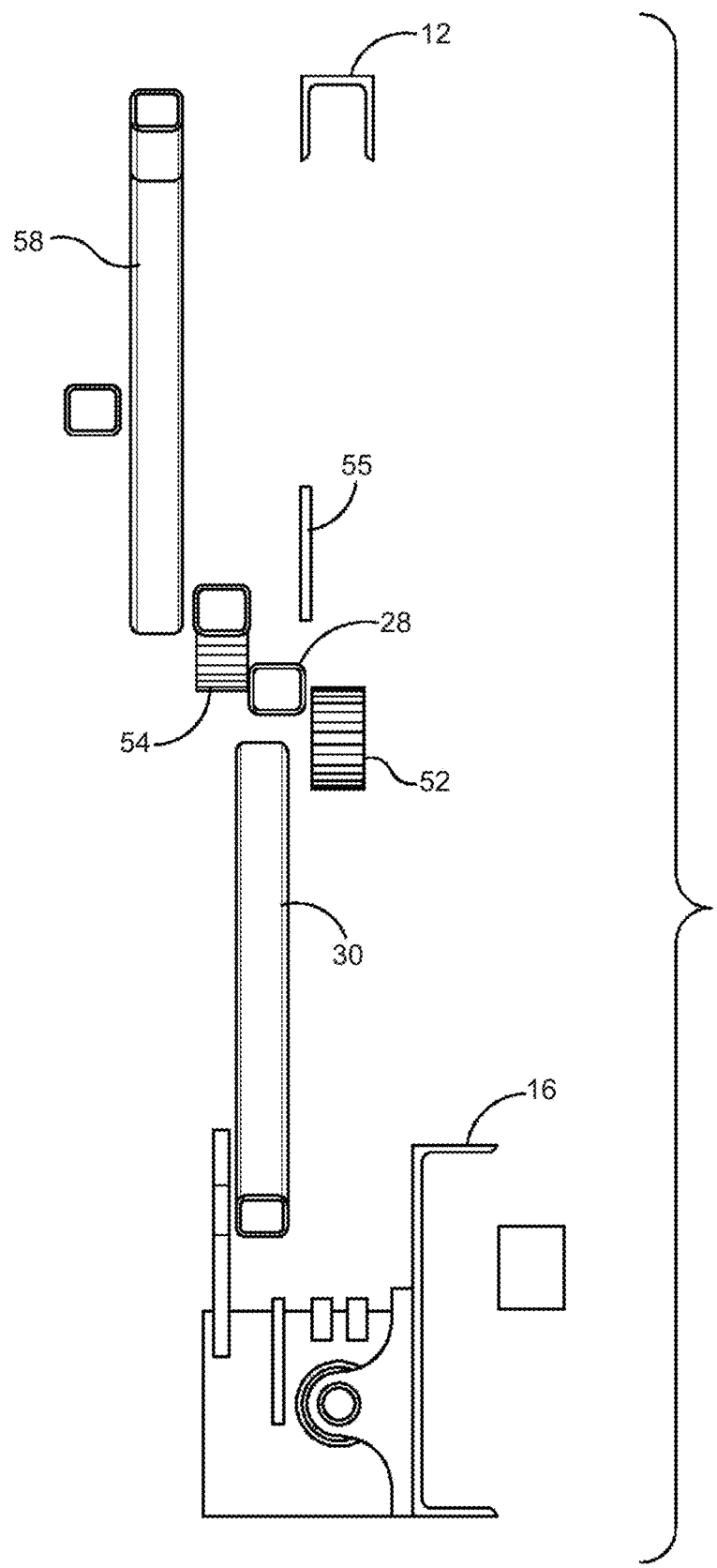
FIG. 14 is a side view of the exploded safety rail of FIG. 13.
Figure 15:
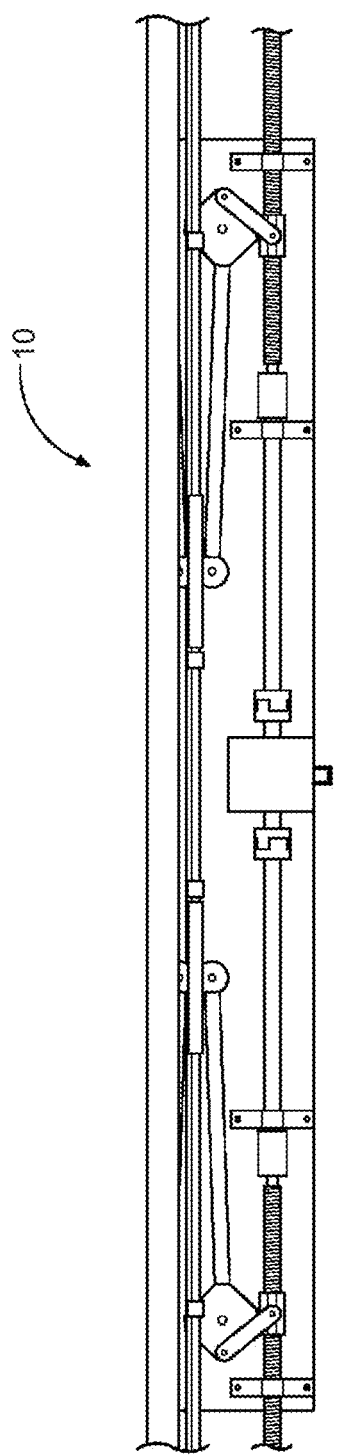
FIG. 15 is a rear view of the safety rail in the fully collapsed position.

Referring again to FIGS. 1-7, as well as FIGS. 13, 14, 20, 21, and 24, each lower linkage arm 30 is attached to its corresponding upper linkage assembly through a midpoint mesh gear assembly 50, which includes two meshed gears: a lower mesh gear 52, and an upper mesh gear 54, as well as a gear plate 55. As best illustrated in FIG. 14, each set of two gears 52, 54 and corresponding gear plate 55 is positioned about and connected to a corresponding rail guide tube 28 in which the center rail 14 is support and lifted when the linkages arms rotate.

Referring also to FIGS. 15-18, each upper linkage arm 22 includes an upper linkage arm 58 that is connected to upper mesh gear 54 at a lower end of the upper linkage arm. An upper end of the linkage arm 58 is connected to top rail 12. In use, the mesh gear assembly 50 functions like an elbow respective to upper linkage arm 58 and lower linkage arm 30 that allows the upper and lower linkage arms to form an angle α that ranges from 0 degrees (fully collapsed position) to 150 degrees (fully raised position) or any position there between. The mesh gear assembly maintains chocking of the upper and lower linkage arms and the level nature of the top and center rail.

Any rotational force in one direction (e.g., clockwise) may be applied to the drive shaft, which will transfer torque to the threaded shaft, and thereby to the threaded screw. In this manner, the ball screw turns rotational motion to linear motion via the threaded nut. The threaded screw will rotate the nut to move in a linear direction. The nut moves the short linkage arm, which rotates (and raises) the lower linkage arm 30. This raising of the lower linkage arm will also simultaneously turn lower mesh gear 52, which is joined and attached to upper mesh gear 54. This will force angle α between the linkage arms to increase. The movement of the mesh gear assembly, which is connected to slidable rail guide tube 28, forces the rail guide tube to move inwardly along center rail 14. Rail stops 56 are positioned along center rail to stop the rail guide tube from moving too far and causing rail instability. Upper linkage arm 50 rotates upwardly as upper mesh gear 54 is turned, which raises upper rail 12 as the outer end of the upper linkage arm is attached to upper rail 12 via pins or other fasteners.

Figure 20:
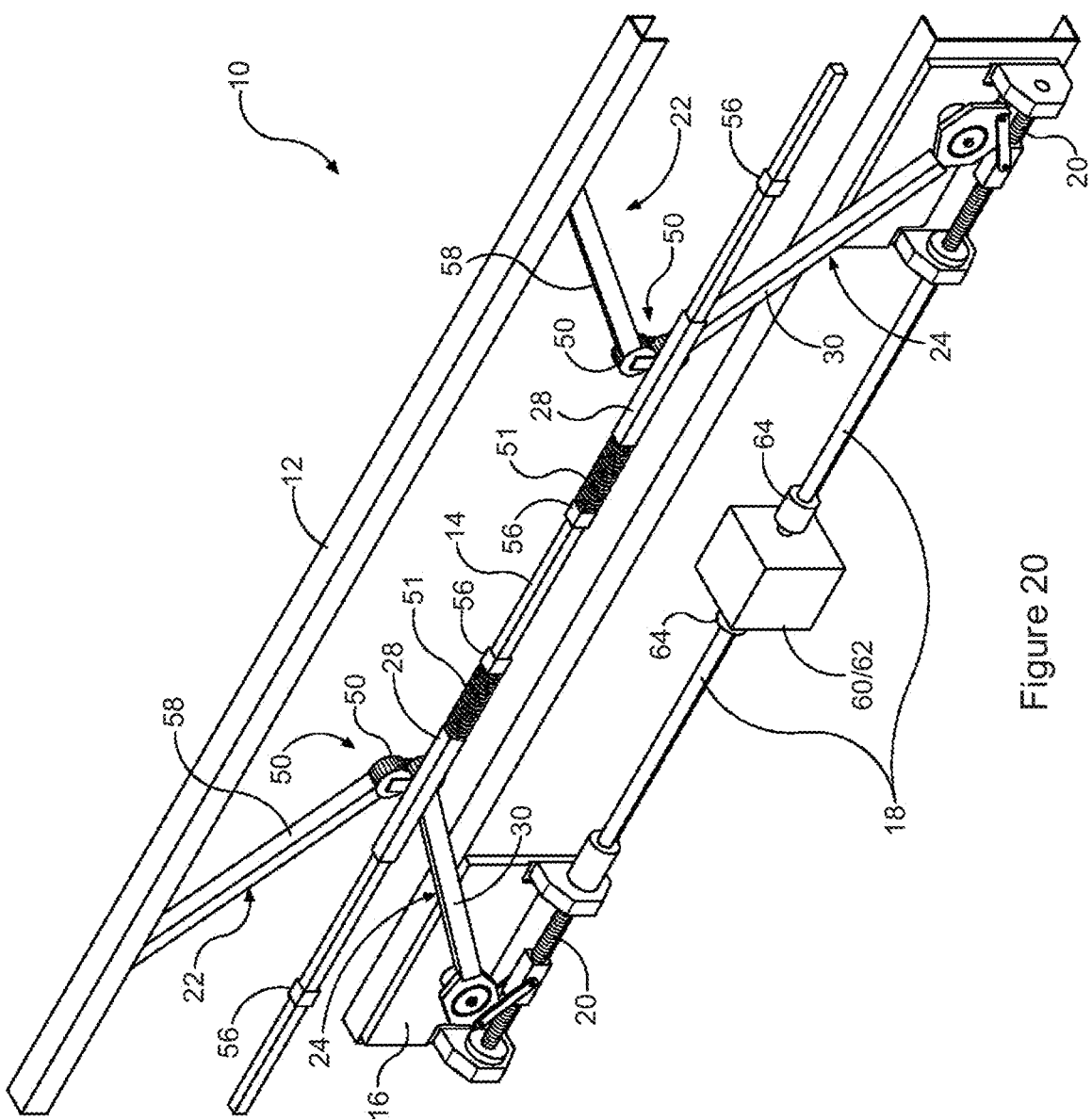
FIG. 20 is a rear isometric view like FIG. 1 except illustrating optional springs between the optional slidable guide rails and optional rail stops and illustrating a fifth embodiment lower linkage arm assembly in raised position with rail bearing assembly, linkage arm, and threaded nut/ball screw assembly.
Figure 21:
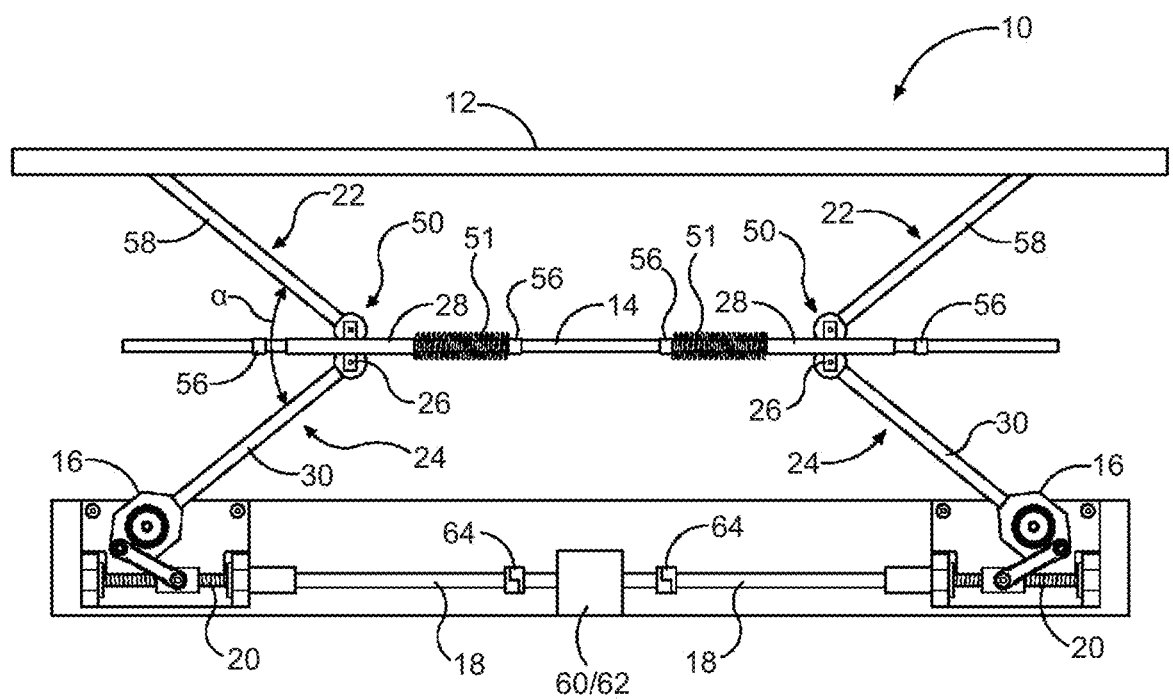
FIG. 21 is a rear view of FIG. 20.
Figure 22:
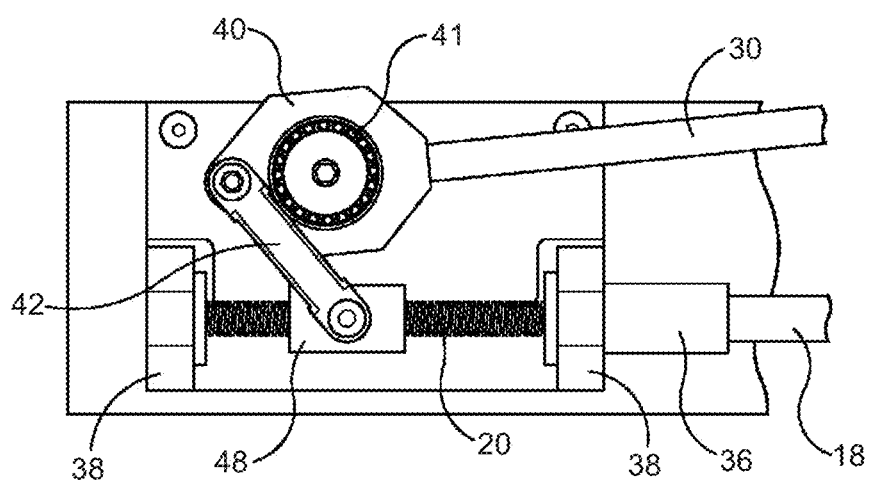
FIG. 22 is en enlarged rear view of the fifth embodiment lower linkage arm assembly in the nearly collapsed position.
Figure 23:
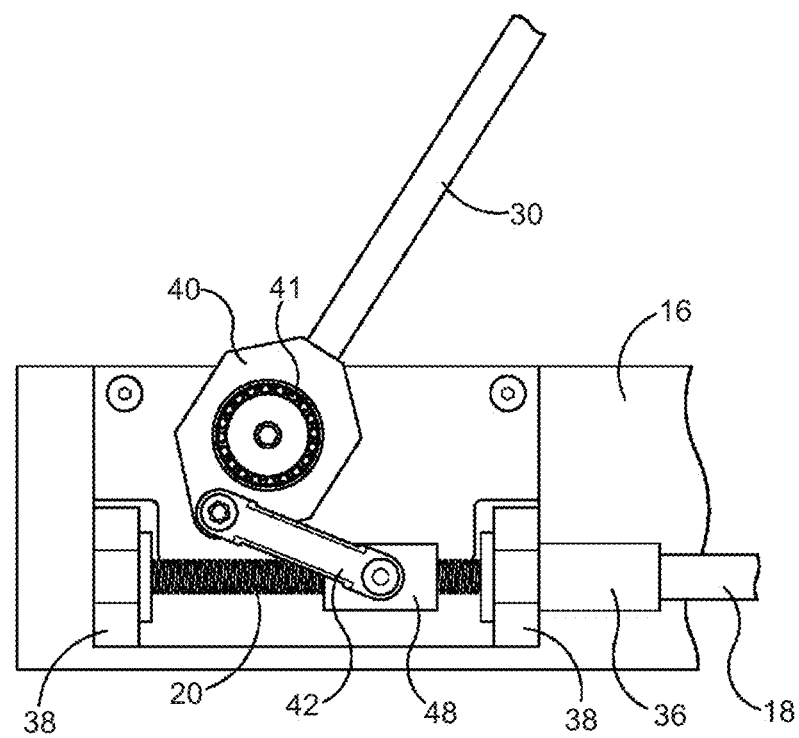
FIG. 23 is an enlarged rear view of the fifth embodiment lower linkage arm assembly in the nearly fully raised position.
Figure 24:
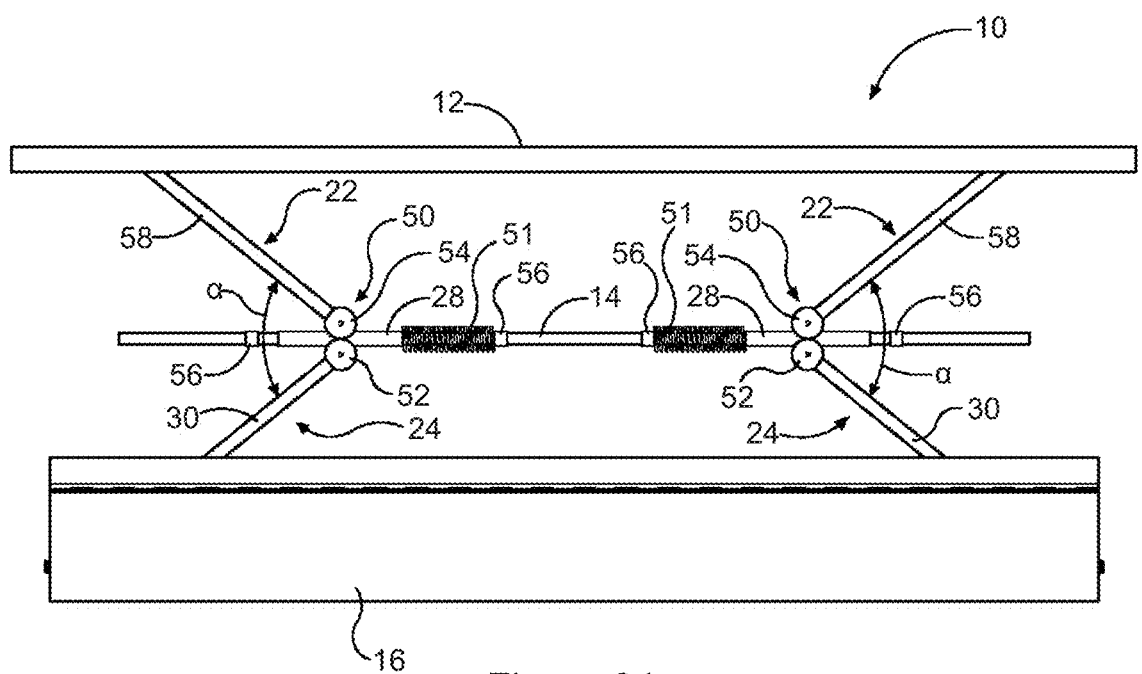
FIG. 24 is a front view of the safety rail of FIG. 20.

As illustrated in FIGS. 20, 21, and 24 optional rail springs 51 may be positioned between the rail guide tube and the rail stop to put tension on the rail guide tube and upper and lower linkage arm assemblies to better hold a vertically upright position. The rail springs keep the center rail aligned with the top rail to prevent "walking" back and forth during motion.

Figure 16:
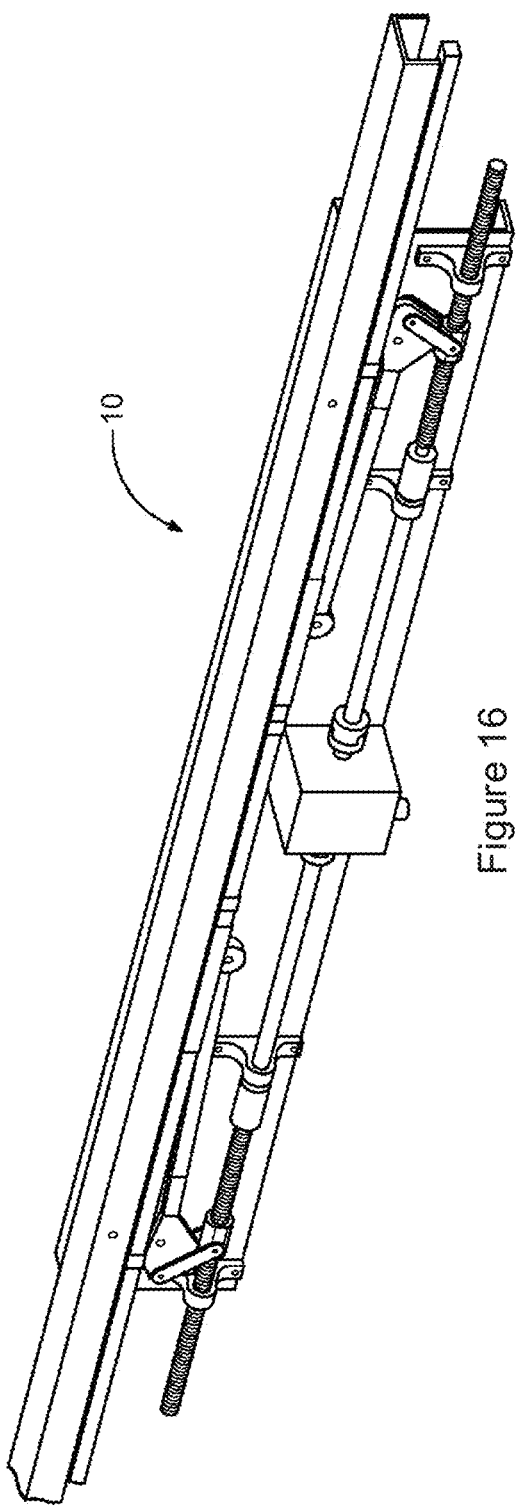
FIG. 16 is a rear perspective view of the safety rail in a slightly raised position.
Figure 17:
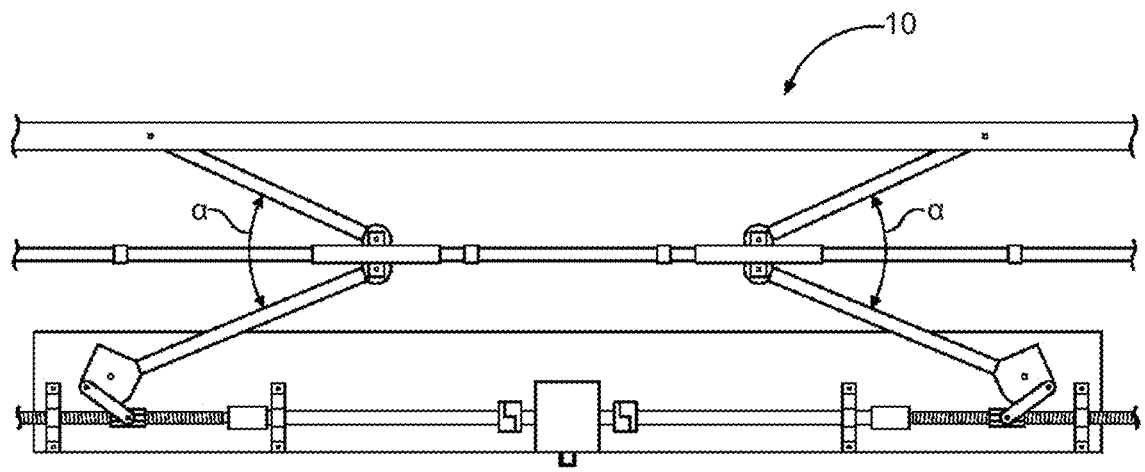
FIG. 17 is a rear view of the safety rail in a partially raised position.
Figure 18:
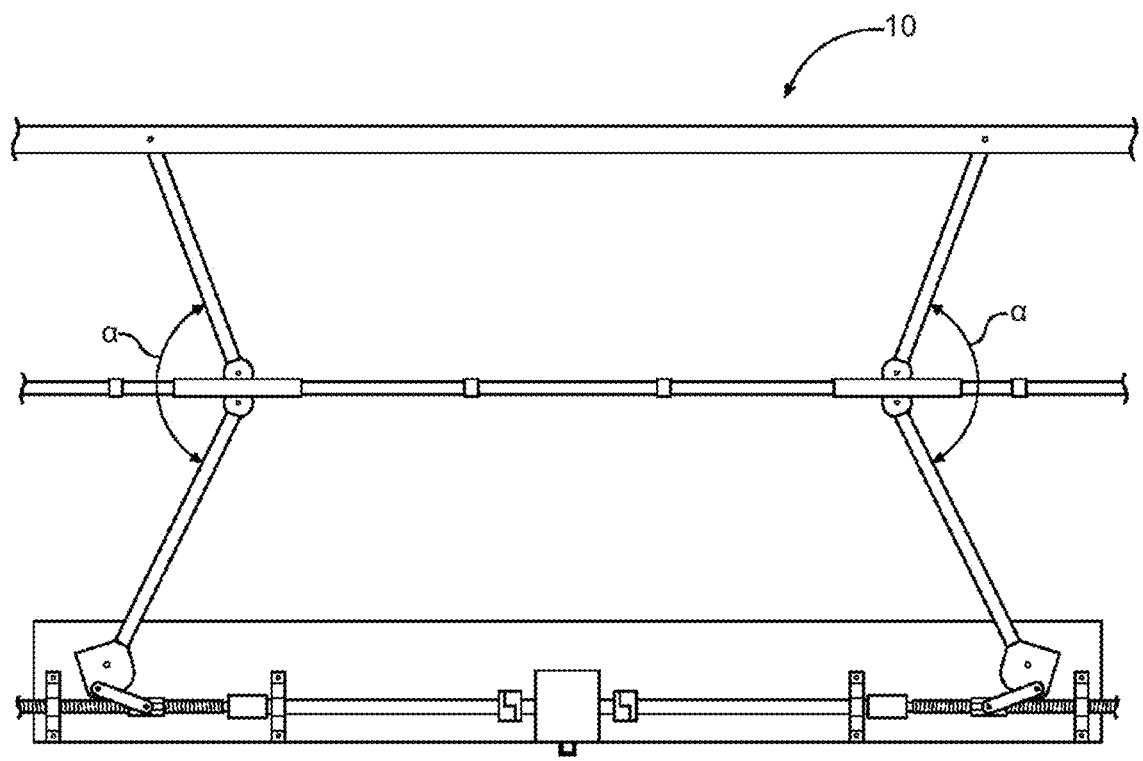
FIG. 18 is a rear view of the safety rail in the fully raised position.

A rotational force in the other direction (e.g., counter clockwise) will rotate the threaded shaft and, therefore the ball screw and threaded nut and all connected linkages, in the reverse direction. The ball screw and threaded nut will move the worm gear and move the short linkage arm 42, and rotate the lower linkage arm 30 so that the lower mesh gear moves in the reverse direction with the upper mesh gear. This action decreases angle α so that the top rail and center rail lower as much as desired. When the rotational force stops, the safety rail maintains its position as of that time. When the safety rail is fully collapsed, the center rail is tucked under the top rail, such as illustrated in FIG. 16, for storage purposes.

In one embodiment, a motor 60 is added to drive shaft 18. Drive shaft 18 may be in two pieces as illustrated in FIGS. 1-7 with the motor being placed there between to rotate each drive shaft. The motor may be pneumatic (e.g., an air motor), electrical, hydraulic, or magnetic.

Various embodiments are adaptable for explosion proof applications, such as painting in a large manufacturing facility. Air motors, (such as explosion proof C1D1 air motors) are particularly suited for explosion proof applications, such as painting airplane parts. An operator with a manual pneumatic valve delivers air pressure to two inputs (orifices) on the air motor. Air pressure to the first input raises the safety rail as described above. Air pressure to the second input lowers the safety rail as described above. In such an air motor application, a rotating air motor shaft transfers rotational force to a drive belt through two cogged pulleys and a cogged belt (not illustrated). Rotational force is transferred to the drive shaft (or drive shafts) via a second cogged pulley (also not illustrated).

Figure 2:
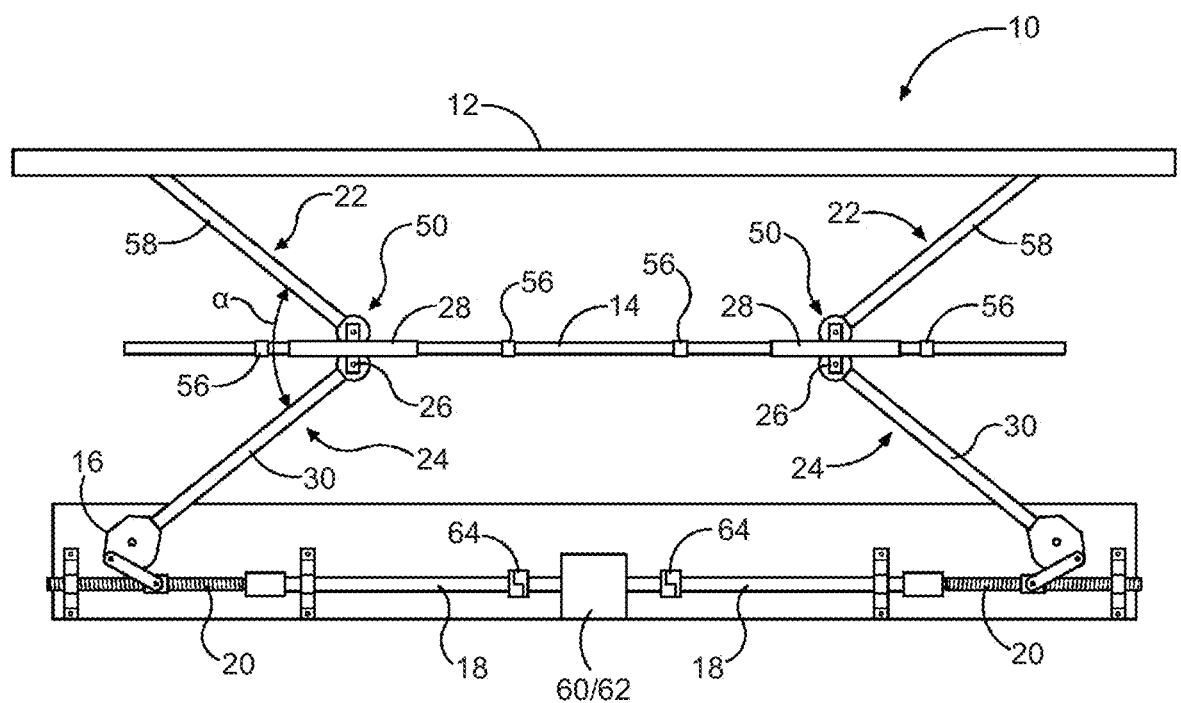
FIG. 2 is a rear view of the safety rail system of FIG. 1.
Figure 3:
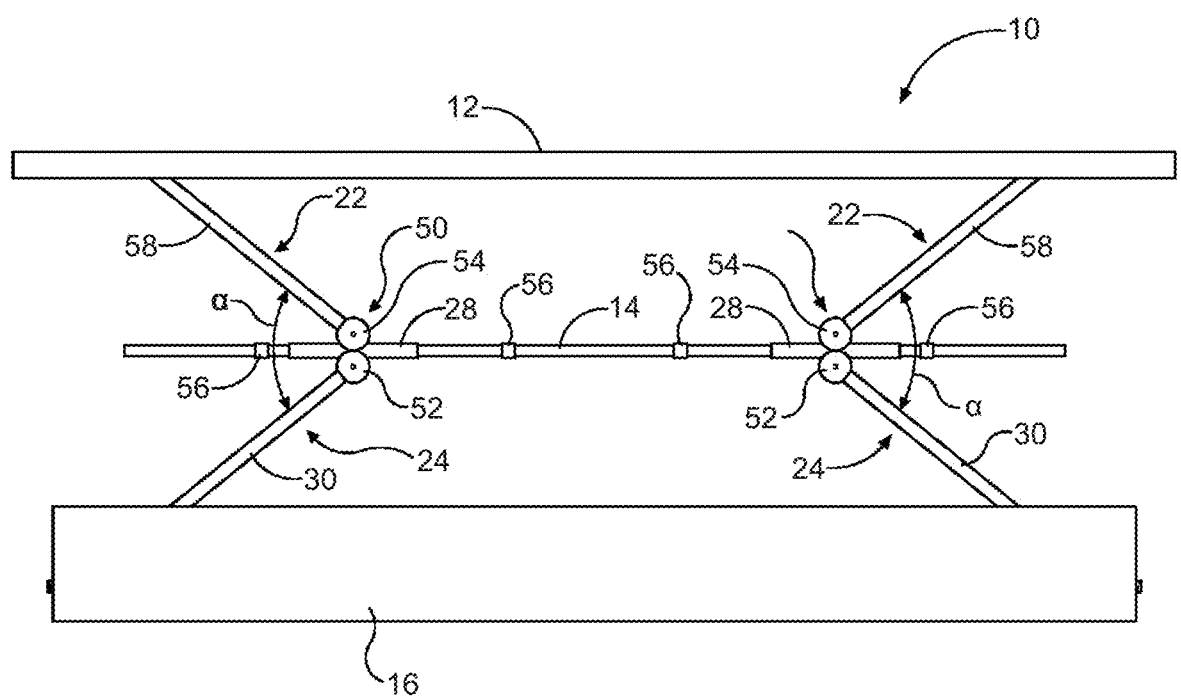
FIG. 3 is a front view of the safety rail system of FIG. 1.
Figure 4:
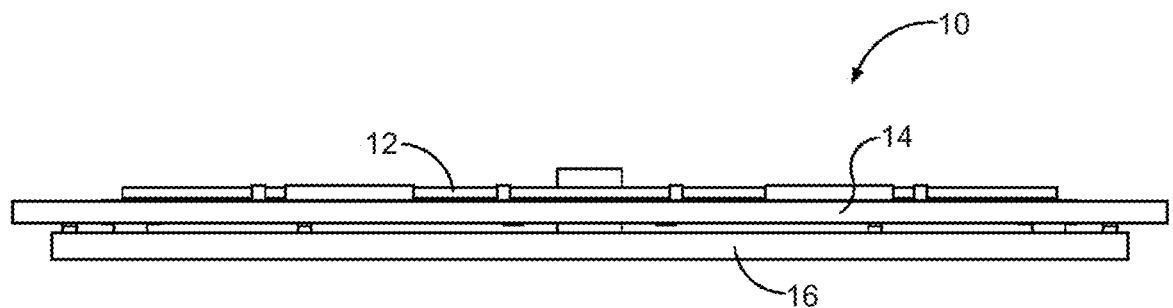
FIG. 4 is a top view of the safety rail system of FIG. 1.
Figure 5:
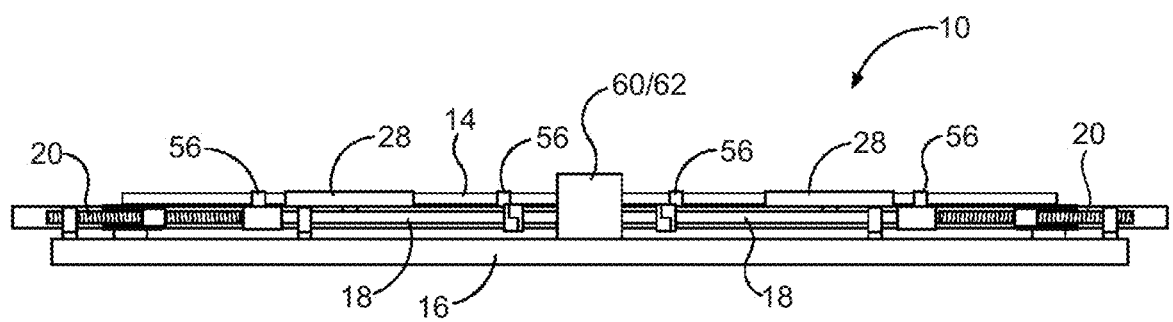
FIG. 5 is a bottom view of the safety rail system of FIG. 1.
Figure 6:
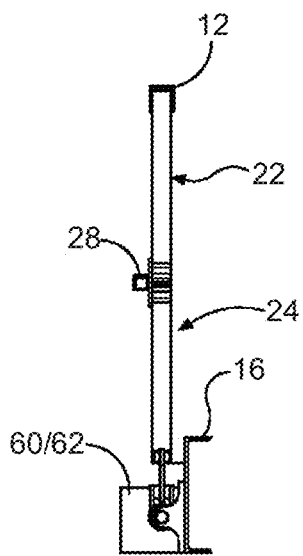
FIG. 6 is a left side view of the safety rail system of FIG. 1.
Figure 7:
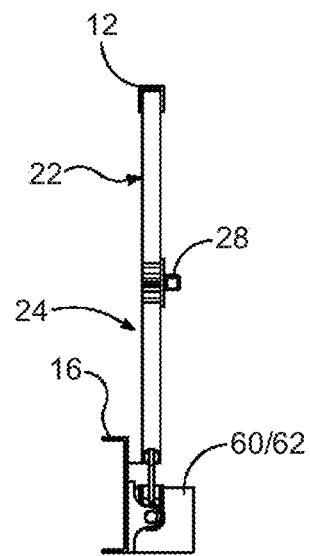
FIG. 7 is a right side view of the safety rail system of FIG. 1.

An optional speed reducer 62 may be added. A pair of reducer couplers 64 may be positioned between the speed reducer 62 and the two drive shafts (as illustrated in FIGS. 1 and 2).

Figure 25:
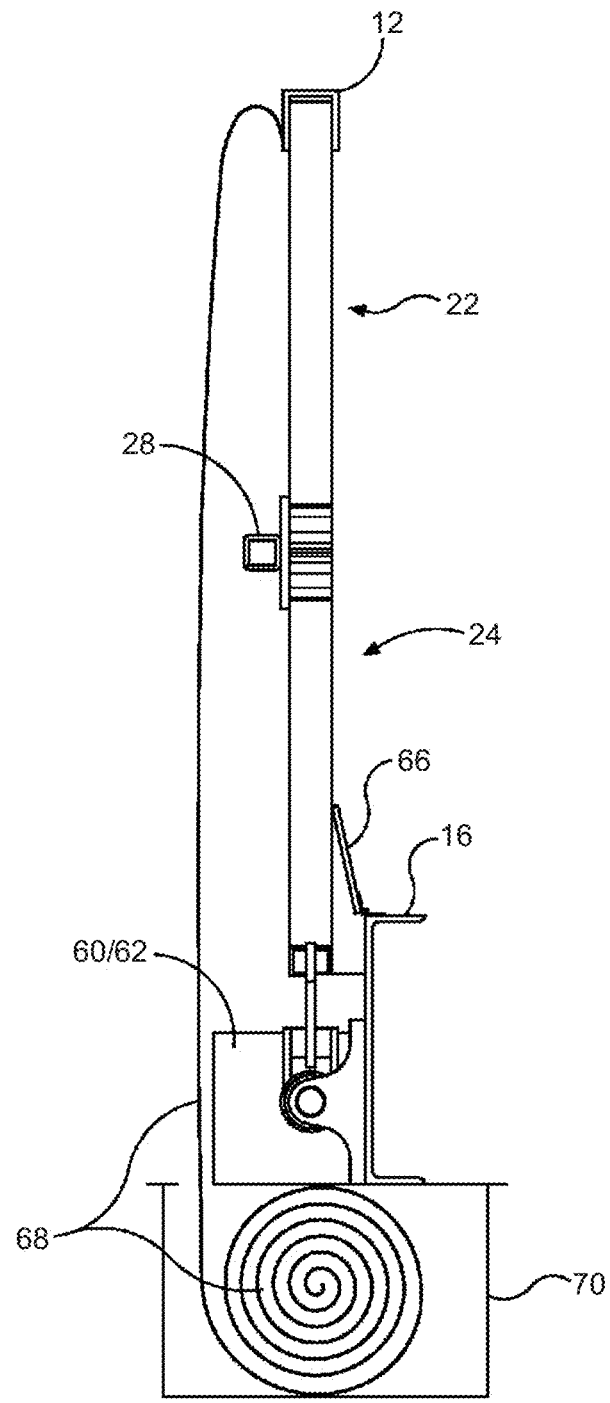
FIG. 25 is a is a side view illustrating an optional kick plate operably connected to the base and an optional curtain that is operably connected to a portion of the base and the top rail and raises and lowers when the safety rail is raised or lowered.

Referring to FIG. 25 an optional kick plate 66 may be added to the base. The kick plate will rotate or slide vertically during employment. Further, an optional raisable safety curtain 68 may be interconnected to base 16, such as through a box 70 attached to base 16. The safety rail is curled up in the box and unrolls out through a slot and is attached to the top rail. The safety curtain raises when the safety rail is raised and curls back in its box when the safety rail is collapsed and can be attached on either side.

The safety rail system can be adapted for industrial use, commercial use, and residential use (both indoors and outdoors). Indoor residential applications can be made from lightweight materials and made in a smaller configuration to function as a pet or child gate.

Figure 26:
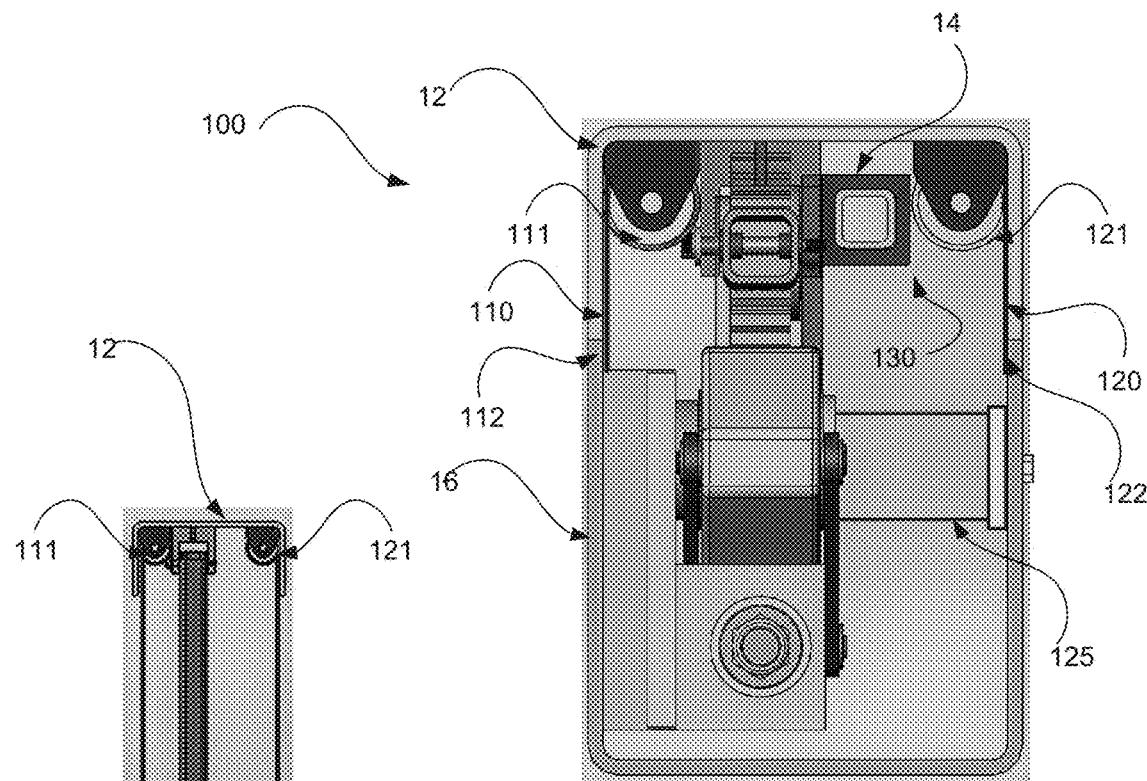
FIG. 26 shows an embodiment of a dual curtain vertically raising safety rail in a lowered position according to an embodiment of the subject matter disclosure herein.

FIG. 26 shows an embodiment of a dual curtain vertically raising safety rail 100 in a lowered position according to an embodiment of the subject matter disclosure herein. In industry, various safety rail may often be required to have some manner of safety curtain or mesh lining one or both sides of a rail in order to prevent objects or persons from falling through the rail to the areas below the safety rail. Having to deploy a safety curtain at each deployment of the vertically raising safety rail (after raising) can be time consuming and cumbersome. In the embodiments discussed next, one or more safety curtains 110 and 120 are stowed within the top rail 12 of the vertically raising safety rail system 100.

FIG. 26 shows an embodiment of the vertical raising safety rail system 100 with a dual curtain assembly disposed therein. This embodiment shows a moveable top rail 12 coupled to a moveable center rail assembly 14 positioned above a base 16 and below the top rail 12. As discussed with respect to FIGS. 1-7 above, the vertical raising safety system 100 includes a drive shaft, a motor configured to maneuver the drive shaft, a lower linkage arm assembly coupled to the base and to the center rail assembly, the lower linkage arm assembly configured to maneuver the center rail assembly relative to the base in response to a force is applied to the drive shaft, and an upper linkage assembly coupled to the center rail assembly and the top rail, the upper linkage assembly configured to maneuver the top rail relative to the center rail assembly. These features are not enumerated in FIG. 26 and are not discussed further in this embodiment.

This embodiment further includes a curtain assembly having a curtain 110 coupled to an anchor point 112 at the base 16 and a take-up roller 111 disposed in the top rail 12. The curtain assembly is configured to unfurl the curtain 110 during the maneuvering of the top rail 12 away from the base 16. That is, as the top rail 12 is moved upwards by actuating the motor, the lower portion of the curtain 110 remains anchored at the anchor point 112 and pulls the curtain 110 to a deployed position as the take-up roller 111 unfurls the curtain 110, thereby providing a canopy over one side of the vertical plane of the vertically raising safety rail system 100.

As shown in FIG. 26, this embodiment includes a second curtain 120 as well. Thus, the second curtain 120 coupled to a second anchor point 122 at the base 16 and a second take-up roller 121 is disposed in the top rail 12. The dual curtain assembly is configured to unfurl the second curtain 120, similar to the first curtain 110, during the maneuvering of the top rail 12 away from the base 16. That is, as the top rail 12 is moved upwards by actuating the motor, the lower portion of the second curtain 1120 remains anchored at the second anchor point 122 and pulls the second curtain 120 to a deployed position as the take-up roller 121 unfurls the second curtain 120, thereby providing a canopy over the other side of the vertical plane of the vertically raising safety rail system 100.

The dual curtain assembly is disposed within a cavity 130 of the top rail 12. The top rail cavity is defined as a space below a top surface of the top rail 12 and between an outer vertical member of the top rail 12 and an inner vertical member of the top rail 12, wherein outer and inner may refer to a personnel-facing surface (inner) and an opposite surface (e.g., not facing personnel). Each curtain 110 and 120 may comprise a material from the group composed of: a nylon material, a canvas material, a metallic mesh material, and a tarp material, and each curtain 110 and 120 are not necessarily made of the same material or only one material. Further, the material may be rather thin on the order of 150-200 mil.

Each take-up roller 111 and 121 of the dual curtain assembly comprises a take-up mechanism that may be biased to hold the curtain 110 and 120, respectively, in a rolled-up position and biased to pinch an outer surface of each curtain 110 and 120 against an inner surface of the top rail 12. Each take-up roller 111 and 121 may comprise a diameter of 1-inch. Further, the anchor points 112 and 122 are shown as disposed on the inside vertical surface of a trough of the base 16, but may be located in any suitable anchor point position so as to unfurl the curtain when the vertically raising safety rail system 100 is actuated. As alluded to above, the safety curtains 110 and 120 may only be disposed on one side or the other or may be disposed on both sides as shown in FIG. 26. Further, in order to provide additional stability to the raised safety rail, a horizontal support member 125 may be disposed between an inner surface of the base 16 and a portion of the apparatus for the motor.

Figure 27:
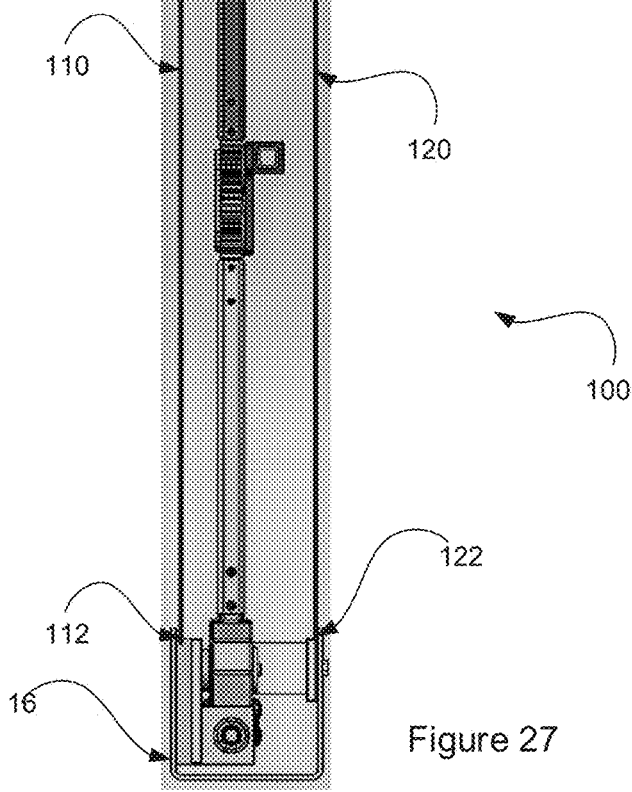
FIG. 27 shows an embodiment of a dual curtain vertically raising safety rail in a raised position according to an embodiment of the subject matter disclosure herein.

FIG. 27 shows an embodiment of a dual curtain vertically raising safety rail system 100 in a raised position according to an embodiment of the subject matter disclosure herein. In this view, each curtain 110 and 120 is shown in an unfurled, deployed position as each curtain 110 and 120 remains anchored at respective anchor points 112 and 122 after being unrolled from respective take-up rollers 111 and 121. Further, in other embodiments not shown, the vertically raising safety rail system 100 may be deployed in any orientation. For example, the base may be secured to a ceiling and the "top" rail 12, with the new upside down orientation, becomes a "lower" rail (or sometimes called a covering rail as it covers the dual curtain assembly) that lowers away from the base anchored to the ceiling when actuated. In still other embodiments, the system 100 may be deployed horizontally when mounted on a wall or other immovable or stationary surface. As such, all references to specific orientation herein are relative with respect to how the system 100 is deployed.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A vertically raising safety rail assembly, comprising:
    a movable top rail;
    a base;
    a movable center rail positioned above the base and below the top rail, the movable center rail held parallel to the top rail with at least one slidable guide tube through which the movable center rail is disposed;
    a drive shaft;
    a motor configured to maneuver the drive shaft;
    a lower linkage arm assembly coupled to the base and to the movable center rail, the lower linkage arm assembly configured to maneuver the movable center rail relative to the base in response to a force applied to the drive shaft; and
    an upper linkage assembly coupled to the center rail and the movable top rail, the upper linkage assembly configured to maneuver the movable top rail relative to the movable center rail; and
    a curtain assembly having a curtain coupled to an anchor point at the base and a take-up roller disposed in the movable top rail, the curtain assembly configured to unfurl the curtain in response to maneuvering the movable top rail away from the base.

2. The safety rail assembly of claim 1, further comprising an additional lower linkage arm assembly coupled to a corresponding additional upper linkage arm assembly at a midpoint mesh gear assembly.

3. The safety rail assembly of claim 1, wherein the movable center rail comprises a tubular center rail and is configured to be received into the at least one slidable guide tube.

4. The safety rail assembly of claim 1, wherein the drive shaft is operably coupled to the base.

5. The safety rail assembly of claim 1, wherein the curtain comprises a material from the group consisting of: a nylon material, a canvas material, a metallic mesh material, and a tarp material.

6. The safety rail assembly of claim 1, wherein the take-up roller of the curtain assembly comprises a take-up mechanism biased to hold the curtain in a rolled-up position and biased to pinch an outer surface of the curtain against an inner surface of the movable top rail.

7. The safety rail assembly of claim 1, wherein the movable top rail comprises a cavity disposed below a top rail surface and between an outer vertical member of the movable top rail and an inner vertical member of the movable top rail, wherein the curtain assembly is disposed in the cavity.

8. The safety rail assembly of claim 1, wherein the motor comprises a motor from the group consisting of: a pneumatic motor, an electrical motor, a hydraulic motor, and a magnetic motor.

9. A vertically raising safety rail assembly, comprising:
    a movable top rail;
    a base;
    a movable center rail positioned above the base and below the top rail;
    a drive shaft;
    a motor configured to maneuver the drive shaft;
    a lower linkage arm assembly coupled to the base and to the movable center rail, the lower linkage arm assembly configured to maneuver the movable center rail relative to the base in response to a force applied to the drive shaft; and
    an upper linkage assembly coupled to the center rail assembly and the movable top rail, the upper linkage assembly configured to maneuver the movable top rail relative to the movable center rail; and
    a curtain assembly having a curtain coupled to an anchor point at the base and a take-up roller disposed in the top rail, the curtain assembly configured to unfurl the curtain in response to maneuvering the movable top rail away from the base;
    wherein the curtain assembly further comprises a second curtain coupled to a second anchor point at the base and a second take-up roller disposed in the top rail, the curtain assembly further configured to unfurl the second curtain in response to maneuvering the top rail away from the base.

10. The safety rail assembly of claim 9 wherein the first curtain is disposed on a first side of the movable center rail and the second curtain is disposed on a second side of the movable center rail that is different from the first side of the movable center rail.

11. A safety rail system, comprising:
    a mount configured to secure a maneuverable safety rail to an immovable surface;
    a covering rail;
    a base;
    a center rail positioned between the base and the covering rail, the center rail held parallel to the covering rail with at least one slidable guide tube through which the center rail is disposed, the center rail positioned above the base and below the covering rail;
    a drive shaft;
    a motor configured to maneuver the drive shaft;
    a first linkage arm assembly coupled to the base and to the center rail, the first linkage arm assembly configured to maneuver the center rail relative to the base in response to a force applied to the drive shaft; and
    a second linkage assembly coupled to the center rail and the covering rail, the second linkage assembly configured to maneuver the covering rail relative to the center rail; and
    a curtain assembly having a curtain coupled to an anchor point at the base and a take-up roller disposed in the covering rail, the curtain assembly configured to unfurl the curtain in response to maneuvering the covering rail away from the base.

12. The system of claim 11, wherein the immovable surface comprises a ceiling.

13. The system of claim 11, wherein the immovable surface comprises a wall.

14. The system of claim 11, wherein the immovable surface comprises a catwalk.

\* \* \* \* \*